(12) United States Patent
Chai et al.

(10) Patent No.: US 6,950,442 B2
(45) Date of Patent: Sep. 27, 2005

(54) METHOD FOR INCREASING DATA TRANSMISSION SPEED IN IS-95B SYSTEM

(75) Inventors: Geun-Jik Chai, Ichon-shi (KR); Chul-Koo Kwon, Ichon-shi (KR); Byoung-Kyu Seon, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 876 days.

(21) Appl. No.: 09/815,535

(22) Filed: Mar. 21, 2001

(65) Prior Publication Data

US 2001/0055292 A1 Dec. 27, 2001

(30) Foreign Application Priority Data

Mar. 21, 2000 (KR) ................................. 10-2000-0014318

(51) Int. Cl.[7] ............................. H04J 3/16; H04J 3/24
(52) U.S. Cl. ................. 370/470; 370/471; 370/472; 370/474; 370/476
(58) Field of Search ............................. 370/232, 233, 370/234, 252, 253, 329, 345, 349, 401, 470, 471, 472, 474, 476

(56) References Cited

U.S. PATENT DOCUMENTS 5,513,172 A    4/1996  Shikama et al. ............. 370/13
6,359,877 B1 *  3/2002  Rathonyi et al. ........... 370/349
6,636,492 B1 * 10/2003  Son et al. .................... 370/329

* cited by examiner

Primary Examiner—Chi Pham
Assistant Examiner—Christopher Grey
(74) Attorney, Agent, or Firm—McDonnell Boehnen Hulbert & Berghoff LLP

(57) ABSTRACT

A method for increasing data transmission speed in an international standard (IS)-95B system includes the steps of: a) by an IWF interface unit, when receiving a frame relay (FR) frame from the IWF unit, counting total bytes included in the FR frame and storing the FR frame in a storage unit of an IWF interface unit; b) determining if data bytes included in the FR frame are larger than bytes needed to generate an inter system link protocol (ISLP) frame of maximum size; c) if the data bytes included in the FR frame are larger than the bytes needed to generate the ISLP frame of maximum size, generating and transmitting the ISLP frame of maximum size to base station controllers (BSCs) based on the FR frame; d) determining if remaining data bytes included in the FR frame that is stored in the storage unit are larger than the bytes needed to generate the ISLP frame of maximum size; e) and if the remaining data bytes are not larger than the bytes needed to generate the ISLP frame of maximum size, generating and transmitting the ISLP frame to the BSC based on the remaining data bytes and another FR frame transmitted from the IWF unit, otherwise repeating the step b).

8 Claims, 5 Drawing Sheets

[ISLP FRAME]

METHOD FOR INCREASING DATA TRANSMISSION SPEED IN IS-95B SYSTEM

FIELD OF THE INVENTION

This invention relates to a method for increasing a data transmission speed in an international standard-95 (IS-95) system; and more particularly, to a method for increasing a data transmission speed by converting maximum quantity of data into an inter system link protocol (ISLP) frame and transmitting the same in an international standard-95 (IS-95) system.

DESCRIPTION OF THE PRIOR ART

Nowadays, a voice communication service and a radio data service are provided to a great number of subscribers in a radio communication service. Before long, most of mobile communication service markets will be occupied with the radio data service of high speed.

There are proposed a plurality of standards for the radio data service such as an international standard-95A (IS-95A), an IS-95B, an IS-95C, an IS-2000, an international mobile talecommunication-2000 (IMT-2000) or the like.

In the IS-95A case, one radio channel is used on a radio path. On the other hand, in the IS-95B case, a plurality of traffic channels are used on the radio path and particularly, a high-speed packet radio data service faster than 64 Kbps can be provided. Arithmetically Considering just a traffic, in case of a 8 Kbps radio path, a data rate can be increased up to 64 Kbps (8 Kbps×8) using 8 channels and in a 13 Kbps radio path case, the data rate can be increased up to 102.4 Kbps (12.9 Kbps×8) using 8 channels.

A high speed radio data service capable of providing data with medium data rate (MDR) is being prepared currently, wherein data are to be downloaded toward a mobile station at data rate of 64 Kbps and uploaded at data rate of 13 Kbps.

In the high speed radio data service with MDR, data are transmitted between a mobile switching center (MSC) and a base station controller (BSC), using an inter system link protocol (ISLP) frame in the same way as in a radio data service with data rate of 8 Kbps or 13 Kbps.

The ISLP frame, as shown in FIG. 1, includes 3 header bytes, 126 data bytes and 2 cyclic redundancy check (CRC) bytes. It takes 20 ms to transmit one ISLP frame from an interworking function (IWF) unit in the MSC to the BSC.

FIG. 2 is a schematic diagram illustrating a conventional device for transmitting radio data in an IS-95B system.

Reference numerals 10, 20, 30 and 40 denote an interworking function (IWF) unit, an interworking function (IWF) interface unit, i.e. a multi protocol & line interface board assembly-frame relay, (MPLA-F) board, a mobile switching center (MSC) and a base station controller (BSC), respectively. The IWF interface unit 20 is included in the MSC 30.

Reference numerals 50 and 60 denote frame relay (FR) frame and a set of 5 ISLP frames. The FR frame 50 is transmitted from the IWF unit 10 to the IWF interface unit 20, and the FR frame 50 can include maximum 509 bytes. The set of 5 ISLP frames includes 4 ISLP frames wherein each of 4 ISLP frames has maximum 131 bytes and one remaining frame that has 83~92 bytes.

FIG. 3 is a flow chart illustrating a method for transmitting radio data in an IS-95B system.

Referring to FIG. 2 and FIG. 3, at the step S10, the IWF interface unit 20 receives the FR frame from the IWF unit 10. At this receipt time, the FR frame can include two types of FR frames, wherein one type of FR frame can includes up to maximum 509 bytes and the other type of FR frame can include remaining 83~92 bytes.

At the step S20, the IWF interface unit 20 counts total bytes that are included in the FR frame and then stores the FR frame in its internal buffer.

At the step S30, the IWF interface unit 20 determines if size of bytes included in the FR frame is larger than 126 bytes, and if not, the logic flow proceeds to step S70, otherwise the logic flow proceeds to step S40.

At the step S40, the IWF interface unit 20 converts the FR frame to a maximum ISLP frame on which 126 data bytes extracted from the FR frame are loaded and then transmits the maximum ISLP frame to the BSC. The maximum ISLP frame includes total 131 bytes consisting of 3 header bytes, the 126 data bytes and 2 CRC bytes.

At the step S50, the IWF interface unit 20 determines if size of remaining data bytes stored in the buffer is larger than 129 bytes, and if not, the logic flow proceeds to step S60, otherwise returns to the step S40.

At the step S60, the IWF interface unit 20 converts the FR frame to an ISLP frame using remaining data bytes extracted from the FR frame and then transmits the ISLP frame to the BSC.

At the S70, the IWF interface unit 20 determines if next FR frame is received from the IWF unit 10, and if not, the logic flow is ended, otherwise returns to the step S10.

At the step S80, the IWF interface unit 20 converts the FR frame to an ISLP frame and then transmits the ISLP frame to the BSC.

As described above, in order to transmit maximum 509 bytes to the BSC, there are needed 5 ISLP frames each of which can includes maximum 126 bytes. However, the 5th ISLP frame loads 83~92 bytes on it and is 39~48 bytes short of maximum 126 bytes. Accordingly, there is caused a data transmission speed drop of 3.12~3.84 Kbps (3.12~3.84 Kbps=39~48 bytes/(20 ms×5 ISLP frames)) in accordance with a conventional method for transmitting radio data in the IS-95B system.

SUMMARY OF THE INVENTION

It is an object of the present invention to provide a method for increasing data transmission speed in an international standard (IS)-95B system by generating transmitting an inter system link protocol (ISLP) frame of maximum size to a base station controller as much as possible.

In accordance with an aspect of the present invention, there is provided a method for increasing data transmission speed in an international standard (IS)-95B system including one or more inter working function (IWF) units, one or more IWF interface units that are included in one or more mobile switching centers and one or more base station controllers (BSCs), the method including the steps of: a) by the IWF interface unite when receiving a frame relay (FR) frame from the IWF unit, counting total bytes included in the FR frame and storing the FR frame in a storage unit of the IWF interface unit; b) determining if data bytes included in the FR frame are larger than bytes needed to generate an inter system link protocol (ISLP) frame of maximum size; c) if the data bytes included in the FR frame are larger than the bytes needed to generate the ISLP frame of maximum size, generating and transmitting the ISLP frame of maximum size to the BSC based on the FR frame; d) determining if remaining data bytes included in the FR frame that is stored in the storage unit are larger than the bytes needed to generate the ISLP frame of maximum size; and e) if the remaining data bytes are not larger than the bytes needed to generate the ISLP frame of maximum size, generating and transmitting the ISLP frame to the BSC based on the remaining data bytes and another FR frame transmitted from the IWF unit, otherwise repeating the step b).

BRIEF DESCRIPTION OF THE DRAWINGS

Other objects and aspects of the invention will become apparent from the following description of the embodiments with reference to the accompanying drawing, in which.

DETAILED DESCRIPTION OF THE PREFERRED EMBODIMENTS

Figure 1:
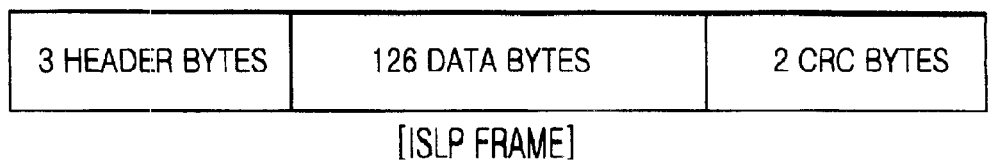
FIG. 1 shows a configuration of a general inter system link protocol (ISLP) frame.
Figure 2:
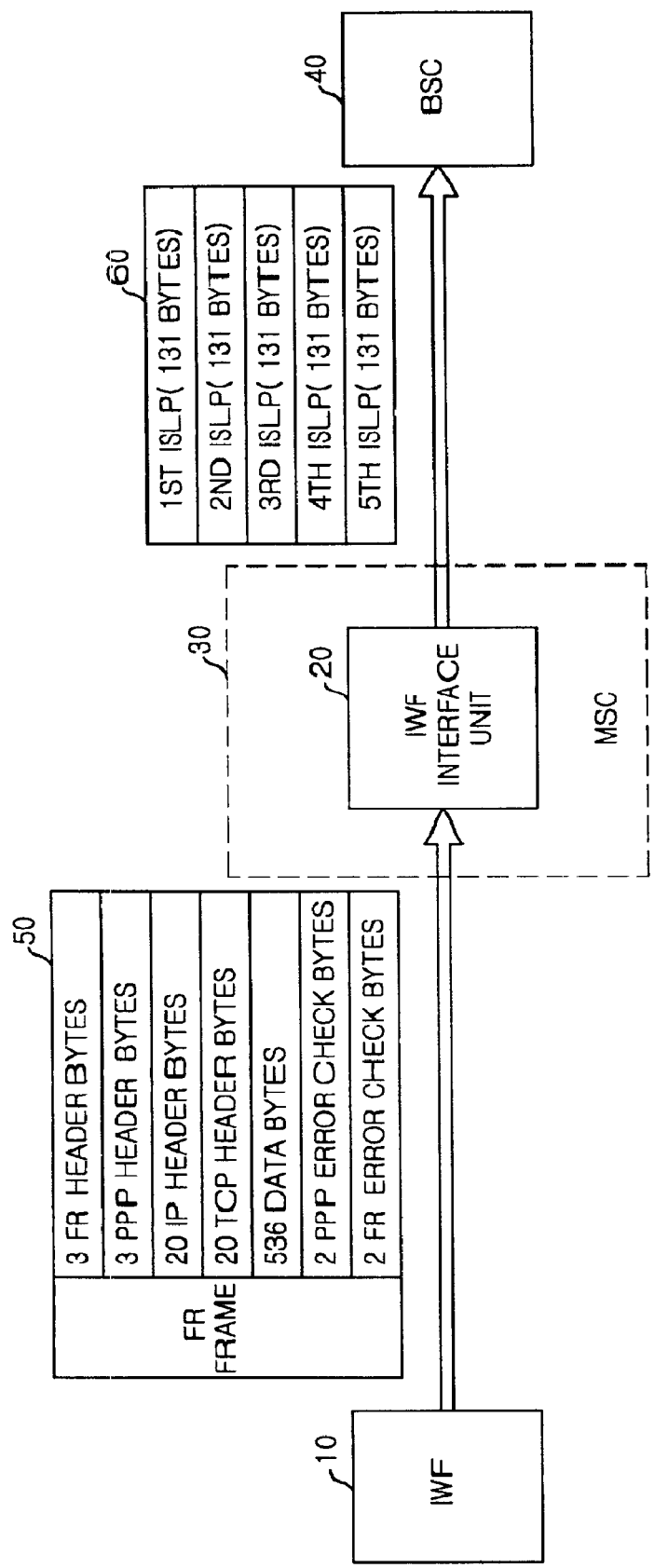
FIG. 2 is a schematic diagram illustrating a conventional device for transmitting radio data in an IS-95B system.
Figure 3:
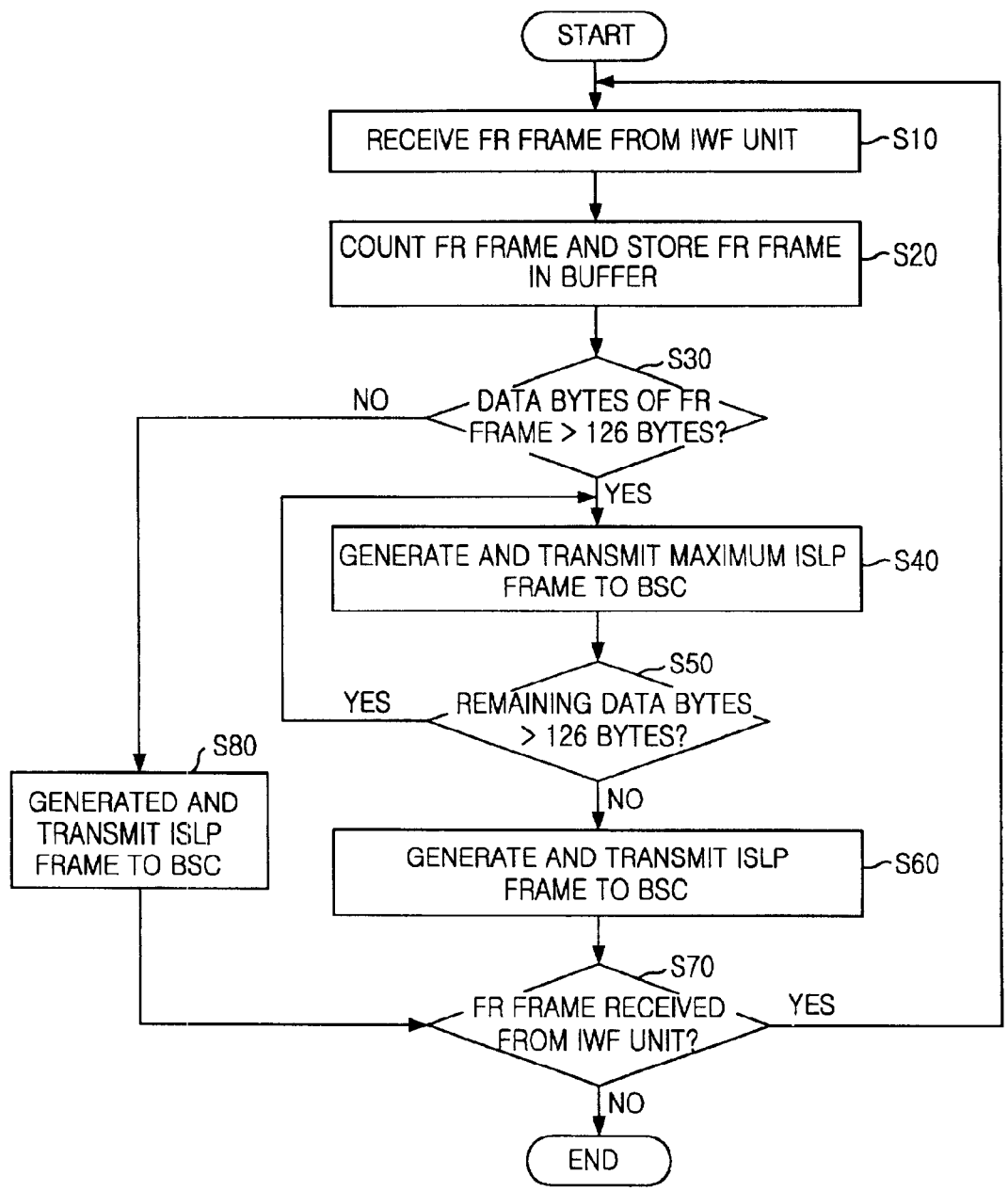
FIG. 3 is a flow chart illustrating a method for transmitting radio data in an IS-95B system.
Figure 4:
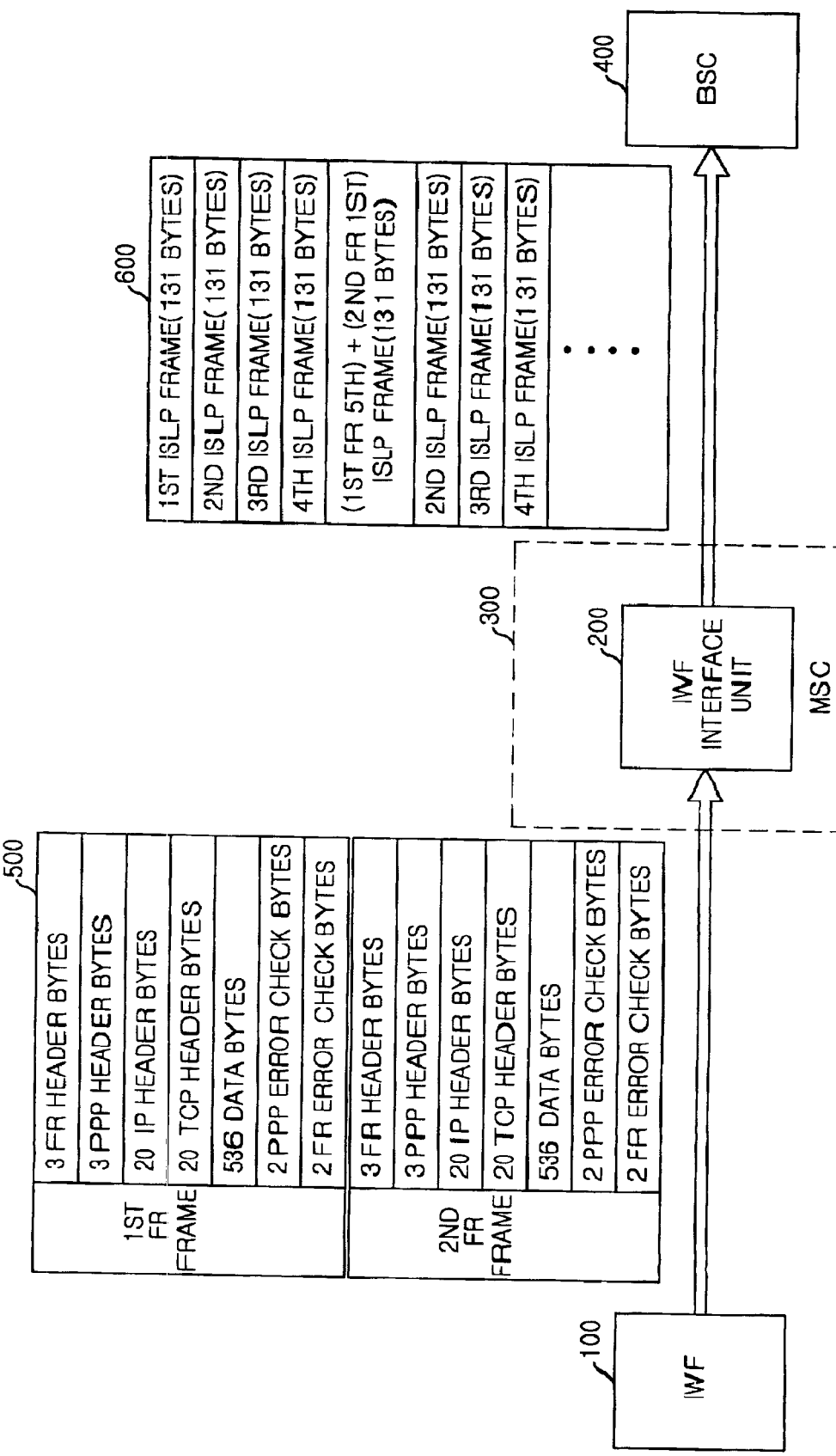
FIG. 4 is a schematic diagram illustrating a device for transmitting radio data in an I-95B system in accordance with the present invention.

FIG. 4 is a schematic diagram illustrating a device for transmitting radio data in an IS-95B system in accordance with the present invention.

The device shown in FIG. 4 includes an interworking function (IWF) unit 100 and an IWF interface unit 200 included in a mobile switching center (MSC) 300.

The IWF unit 100 performs transmitting a frame relay (FR) frame to the IWF interface unit 200. The IWF interface unit 200 performs analyzing the FR frame, converting the FR frame to an inter system link protocol (ISLP) frame and transmitting the ISLP frame to a base station controller (BSC) 400.

Figure 5:
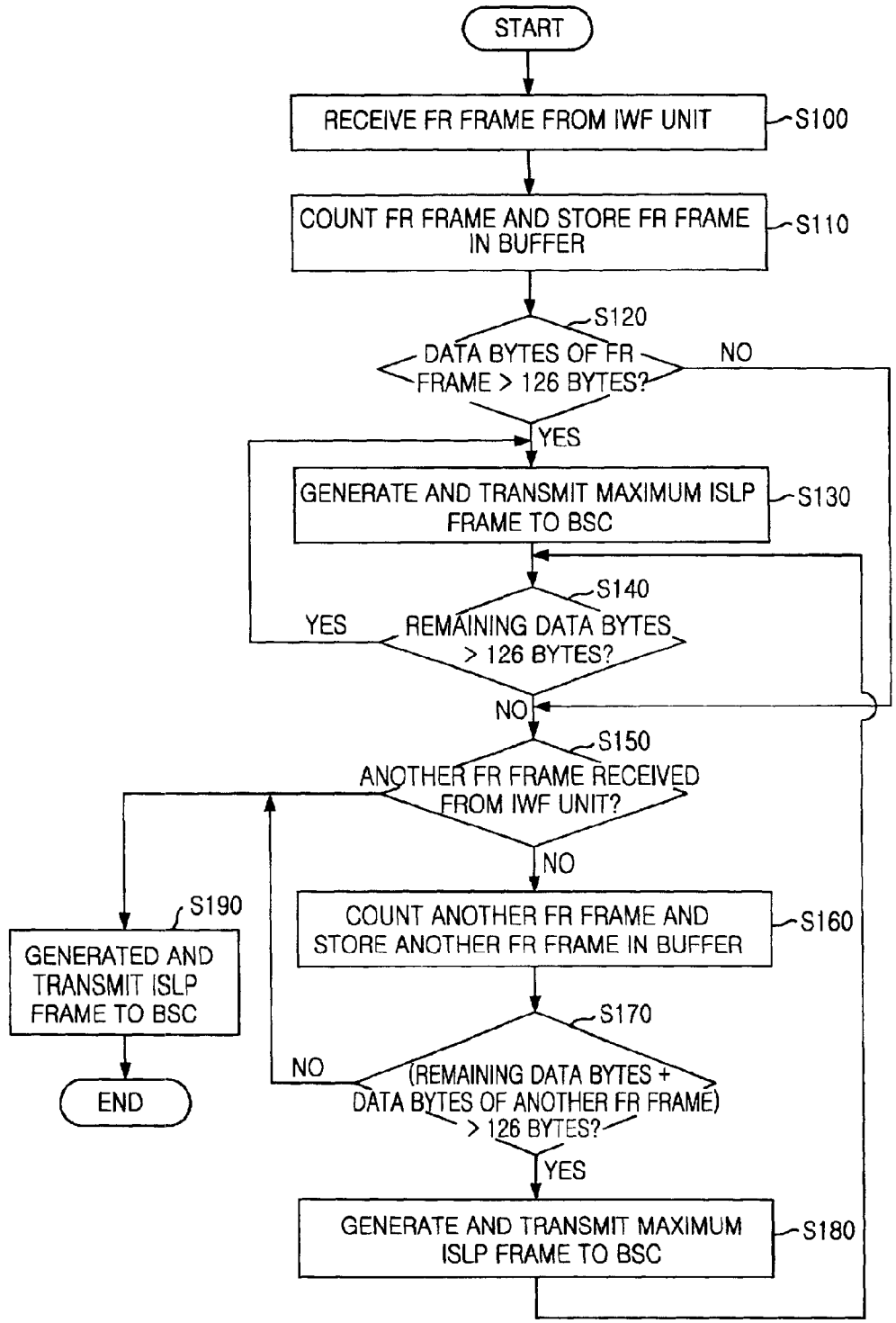
FIG. 5 is a flow chart illustrating a method for transmitting radio data in an IS-95B system in accordance with the present invention.

FIG. 5 is a flow chart illustrating a method for transmitting radio data in an IS-95B system in accordance with the present invention.

At the step S100, the IWF interface unit 200 receives the FR frame from the IWF unit 100. At this receipt time, the FR frame can include two types of FR frames, wherein one type of FR frame can includes up to maximum 509 bytes and the other type of FR frame can include remaining 83~92 bytes.

At the step S110, the IWF interface unit 200 counts total bytes that are included in the FR frame and then stores the FR frame in its internal buffer.

At the step S120, the IWF interface unit 200 determines if size of bytes included in the FR frame is larger than 126 bytes, and if not, the logic flow proceeds to step S150, otherwise the logic flow proceeds to step S130.

At the step S130, the IWF interface unit 200 converts the FR frame to a maximum ISLP frame on which 126 data bytes extracted from the FR frame are loaded and then transmits the maximum ISLP frame to the BSC. The maximum ISLP frame includes total 131 bytes consisting of 3 header bytes, the 126 data bytes and 2 CRC bytes.

At the step S140, the IWF interface unit 200 determines if size of remaining data bytes stored in the buffer is larger than 126 bytes, and if not, the logic flow proceeds to step S150, otherwise returns to the step S130.

At the step S150, the IWF interface unit 200 determines if another FR frame is received from the IWF unit, and if not, the logic flow to step S190, otherwise proceeds to step S160.

At the step S160, the IWF interface unit 200 counts total bytes that are included in another FR frame and then stores another FR frame in its internal buffer.

At the step S170, the IWF interface unit 200 determines if the remaining data bytes added to data bytes included in another FR frame yields bytes lager than 126 bytes, and if not, the logic flow proceeds to step S190, otherwise, proceeds to step S180.

At the step S180, the IWF interface unit 200 adds the remaining data bytes to the data bytes included in another FR frame, generates a maximum ISLP frame on which 126 data bytes are loaded and transmits the maximum ISLP frame to the BSC. Then the logic flow returns to the step S140.

At the step S190, the IWF interface unit 200 converts the FR frame to an ISLP frame and then transmits the ISLP frame to the BSC.

As can be seen from above, performing a method for increasing data transmission speed in the IS-95B system in accordance with the present invention, provides a benefit that in case of being unable to generate maximum size of an ISLP frame that is to be transmitted from the IWF interface unit to the BSC, the data transmission speed can be increased by adding a FR frame that is transmitted from the IWF unit to the IWF interface unit to another next FR frame thereby generating maximum size of the ISLP frame.

Although the preferred embodiments of the invention have been disclosed for illustrative purpose, those skilled in the art will appreciate that various modifications, additions, and substitutions are possible, without departing from the scope and spirit of the invention as disclosed in the accompanying claims.

What is claimed is:

1. A method for increasing data transmission speed in an international standard (IS)-95B system including one or more inter working function (IWF) units, one or more IWF interface units that are included in one or more mobile switching centers and one or more base station controllers (BSCs), the method comprising the steps of:

a) by the IWF interface unit, when receiving a frame relay (FR) frame from the IWF unit, counting total bytes included in the FR frame and storing the FR frame in a storage unit of the IWF interface unit, b) determining if data bytes included in the FR frame are larger than bytes needed to generate an inter system link protocol (ISLP) frame of maximum size;

c) if the data bytes included in the FR frame are larger than the bytes needed to generate the ISLP frame of maximum size, generating and transmitting the ISLP frame of maximum size to the BSC based on the FR frame;

d) determining if remaining data bytes included in the FR frame that is stored in the storage unit are larger than the bytes needed to generate the ISLP frame of maximum size; and e) if the remaining data bytes are not larger than the bytes needed to generate the ISLP frame of maximum size, generating and transmitting the ISLP frame to the BSC based on the remaining data bytes and another FR frame transmitted from the IWF unit, otherwise repeating the step b).

2. The method as recited in claim 1, wherein at the step c), the IWF interface unit generates the ISLP frame of maximum size by converting the FR frame to the ISLP frame.

3. The method as recited in claim 1, wherein the step d) further includes the step of:

if the remaining data bytes are larger than the bytes needed to generate the ISLP frame of maximum size, repeating the step c).

4. The method as recited in claim 1, wherein the step e) includes the steps of:

e1) by the IWF interface unit, determining if another FR frame is received from the IWF unit;

e2) if another FR frame is received from the IWF unit, counting total bytes included in another FR frame and storing another FR frame in the storage unit of the IWF interface unit;

e3) adding the remaining data bytes to data bytes included in the another FR frame to thereby generate combined data bytes;

e4) determining if the combined data bytes are larger than the bytes needed to generate the ISLP frame of maximum size;

e5) if the combined data bytes are larger than the bytes needed to generate the ISLP frame of maximum size, generating and transmitting the ISLP frame of maximum size to the BSC based on the combined data bytes and then repeating the step d);

e6) if the combined data bytes are not larger than the bytes needed to generate the ISLP frame of maximum size, generating and transmitting the ISLP frame of non-maximum size to the BSC based on the combined data bytes.

5. The method as recited in claim 4, wherein at the step e5), the IWF interface unit generates the ISLP frame of maximum size by converting the combined data bytes to the ISLP frame.

6. The method as recited in claim 4, wherein at the step e6), the IWF interface unit generates the ISLP frame of non-maximum size by converting the combined data bytes to the ISLP frame.

7. The method as recited in claim 4, wherein the step e2) further includes the step of:

e7) if another FR frame is not received from the IWF unit, generating and transmitting the ISLP frame of non-maximum size to the BSC based on the remaining data bytes.

8. The method as recited in claim 7, wherein at the step e7), the IWF interface unit generates the ISLP frame of non-maximum size by converting the remaining data bytes to the ISLP frame.

\* \* \* \* \*